(12) United States Patent
Van Els

(10) Patent No.: US 7,572,352 B2
(45) Date of Patent: Aug. 11, 2009

(54) METHOD AND PLANT FOR DESALINATING SALT-CONTAINING WATER

(76) Inventor: Hans Josef Van Els, Meinecke Strasse 46, D-40474 Düsseldorf (DE)

( * ) Notice: Subject to any disclaimer, the term of this patent is extended or adjusted under 35 U.S.C. 154(b) by 242 days.

(21) Appl. No.: 10/536,610

(22) PCT Filed: Nov. 26, 2003

(86) PCT No.: PCT/NL03/00834

§ 371 (c)(1),
(2), (4) Date: Jan. 12, 2006

(87) PCT Pub. No.: WO2004/048273

PCT Pub. Date: Jun. 10, 2004

(65) Prior Publication Data

US 2006/0130826 A1  Jun. 22, 2006

(30) Foreign Application Priority Data

Nov. 28, 2002 (NL) .................................. 1022059

(51) Int. Cl.
*B01D 3/00* (2006.01)
*C02F 1/14* (2006.01)
*F28D 20/00* (2006.01)

(52) U.S. Cl. .................... 203/10; 126/567; 159/47.3; 159/903; 159/DIG. 32; 202/176; 202/185.3; 202/234; 202/235; 203/23; 203/27; 203/DIG. 1; 203/DIG. 8; 203/DIG. 17

(58) Field of Classification Search .................. 159/23, 159/24.2, 47.3, 903, DIG. 32; 202/176, 185.3, 202/234, 235; 203/10, 22, 23, 27, DIG. 1, 203/DIG. 8, DIG. 17; 210/774; 126/567, 126/568
See application file for complete search history.

(56) References Cited

U.S. PATENT DOCUMENTS

| | | | | | |
|---|---|---|---|---|---|
| 4,135,985 | A | * | 1/1979 | La Rocca | 202/176 |
| 4,328,788 | A | | 5/1982 | Wirguin | 125/415 |
| 4,478,685 | A | * | 10/1984 | Mortenson | 202/158 |
| 5,582,690 | A | * | 12/1996 | Weinberger et al. | 203/10 |
| 6,027,607 | A | * | 2/2000 | Corniel | 159/3 |
| 6,165,326 | A | * | 12/2000 | Markopulos | 202/234 |
| 6,494,995 | B1 | * | 12/2002 | Battah | 202/234 |

FOREIGN PATENT DOCUMENTS

DE  1022059  11/2002
GB  2016938  10/1979

* cited by examiner

Primary Examiner—Virginia Manoharan
(74) Attorney, Agent, or Firm—Andrew Wilford

(57) ABSTRACT

Salt-containing water is desalinated by first passing salt-containing water through a heat exchanger disposed in a basin containing solar-heated brine formed by several layers of water lying one above the other in the basin, each of the layers of water forming the brine having a higher salt content than the layer present there above. The heat exchanger is in the lowermost layer of water having a higher temperature than the temperature of the layers of water lying above the lowermost layer of water. The salt-containing water is heated in the basin by solar energy indirect heat exchange with the solar-heated brine to obtain heated salt-containing water. At least part of the heated salt-containing water is evaporated to obtain water vapor, and the water vapor is condensed to obtain desalinated water.

4 Claims, 4 Drawing Sheets

METHOD AND PLANT FOR DESALINATING SALT-CONTAINING WATER

CROSS REFERENCE TO RELATED APPLICATIONS

This application is the US national Phase of PCT Application PCT/NL/2003/000834 filed 26 Nov. 2003 with a claim to the priority of the Dutch Application 1022059 itself filed 28 Nov. 2002.

FIELD OF THE INVENTION

The invention relates to a method for desalinating salt-containing water.

BACKGROUND OF THE INVENTION

The current methods for desalinating salt-containing water use complex plants that consume large amounts of energy.

OBJECT OF THE INVENTION

The object of the invention is to obtain a method wherein the salt can be removed from the water in an efficient manner, using simple means.

SUMMARY OF THE INVENTION

According to the invention this object can be achieved in that the salt-containing water is passed through a heat exchanger disposed in a basin containing brine, whereupon the salt-containing water that has been heated in the heat exchanger is passed through an evaporator for evaporating at least part of the salt-containing water, after which the vapor thus formed is subjected to a condensation process so as to obtain water from which the salt has been removed.

When using the method according to the invention, use is made of the fact that a layer of brine having a comparatively high salt content that has formed in a basin can heat up to a comparatively high temperature under the influence of the radiation from the sun. Using a heat exchanger disposed in said layer of brine, which has a high temperature, the salt-containing water can be heated up in an inexpensive manner and subsequently be supplied to an evaporator, in which water vapor free from salt can be formed, which water vapor is subsequently subjected to a condensation process.

Thus, a method that operates at least substantially exclusively on solar energy is obtained, which makes it possible to achieve an inexpensive and efficient desalination of salt-containing water.

A further aspect of the invention relates to a plant for desalinating salt-containing water, which is in particular suitable for carrying out the method as described above, wherein the plant comprises a basin that contains brine, in which a heat exchanger is disposed, and wherein means for supplying the water to be desalinated are connected to an inlet of the heat exchanger and an inlet of an evaporator is connected to an outlet of the heat exchanger, while an outlet of the evaporator is connected to means for condensing the water vapor that has been formed in the evaporator.

Using the invention, a simple and efficient plant for desalinating water can be obtained, which plant can operate automatically and practically unattended.

BRIEF DESCRIPTION OF THE DRAWINGS

The invention will be explained in more detail below with reference to the accompanying schematic figures.

DETAILED DESCRIPTION OF THE DRAWINGS

Figure 1:
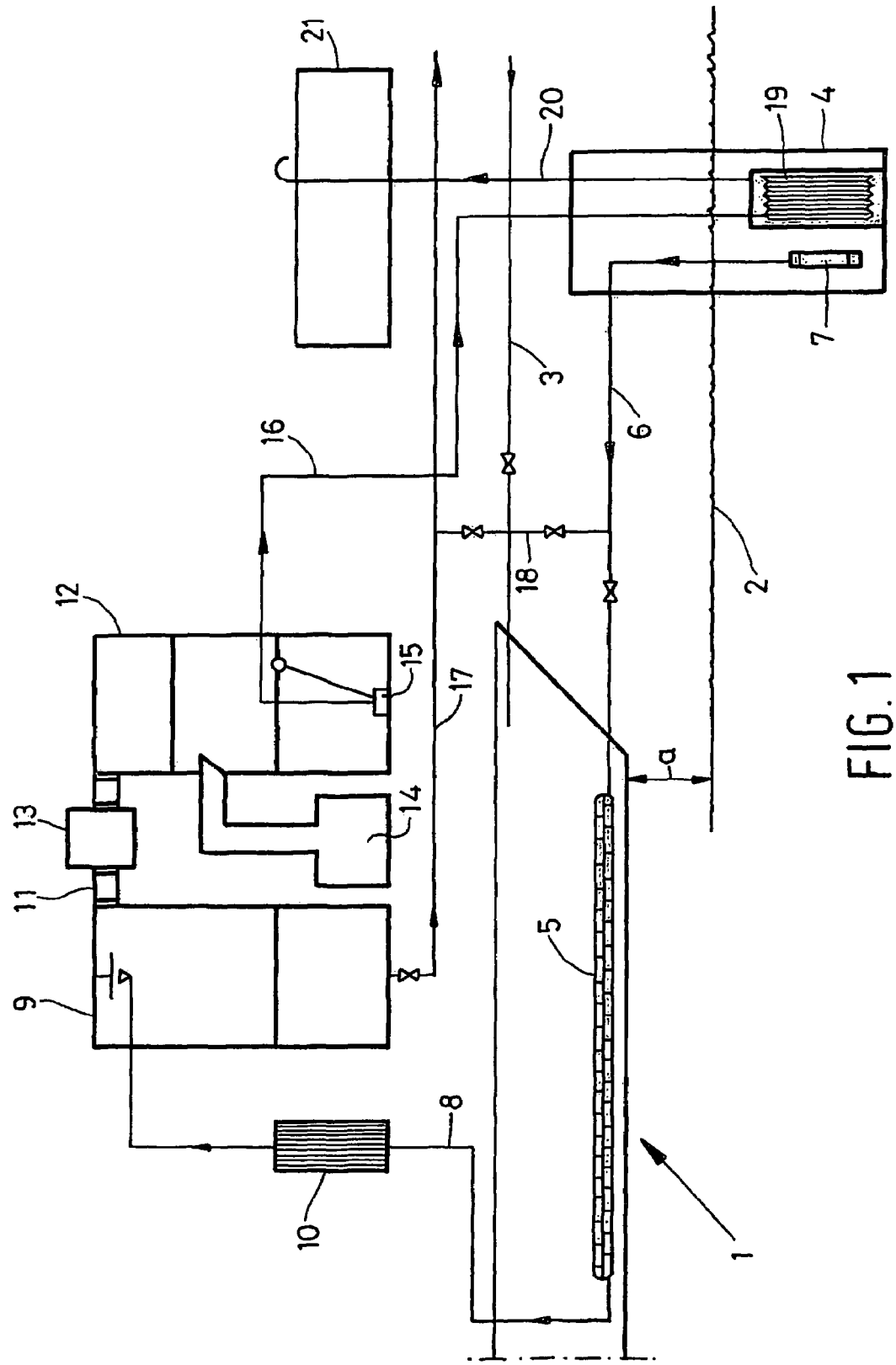
FIG. 1 schematically shows a plant according to the invention.

The plant that is shown in FIG. 1 comprises a basin 1, whose bottom side is spaced from the ground water level 2 by a distance a of at least 2 m.

Near the upper side of the basin 1, a pipe 3 opens into the basin 1, via which pipe salt-containing water, in particular seawater, can be pumped into the basin.

A pit 4 is furthermore present near the basin 1, which pit is kept filled with the water to be desalinated, in particular seawater, at least to the ground water level or the level of the seawater. When the pit 4 extends at least partially below the seawater level, the seawater can be made to flow into the pit 4 automatically without the use of pumps or the like being required.

A heat exchanger 5 is disposed in the basin, near the bottom thereof, to which heat exchanger water from the pit 4 can be supplied via a pipe 6. In an efficient embodiment, a plunger pump 7 disposed in the pit 4, which is connected to one end of the pipe 6, is used for this purpose, although also other means for pumping the water to be desalinated from the pit 4 to the heat exchanger 5 may be used, of course.

Connected to an outlet of the heat exchanger 5 is a pipe 8, via which the water to be desalinated that is being passed through the heat exchanger 5 can be supplied to an evaporator 9 that is known per se.

Preferably, a so-called low-temperature evaporator is used, by means of which water supplied to the evaporator can be evaporated from temperatures even as low as 30° C.

In an efficient embodiment, a flow heater 10, is disposed in the pipe 8, by means of which the water flowing in from the heat exchanger 5 can be additionally heated.

The upper end of the evaporator 9 is connected to the upper end of a condenser 12 via a pipe 11, while furthermore a fan 13 is mounted in the pipe 11 for transporting the vapor formed in the evaporator.

A cooling unit 14 may be connected to the condenser 12 for cooling the water vapor that is being supplied to the condenser.

Present near the bottom side of the condenser 12 is a pump 15, by means of which water that has been condensed in the condenser 12 and from which the salt has been removed can be drained off via a pipe 16.

Connected to the bottom side of the evaporator 9 is a drainpipe 17, via which residual water that remains behind in the evaporator 9 can be drained off to the sea and/or be returned to the heat exchanger 5 via an intermediate pipe 18.

The pipe 16 is connected to a heat exchanger 19 disposed in the pit 4, which is used for preheating water to be desalinated that is present in the pit by giving off heat from the hotter condensed water.

The outlet of the heat exchanger 19 is connected to a collecting basin 21 for the desalinated water via a pipe 20.

The basin 1 will preferably be dug out in the ground, although it is also conceivable for such a basin to be built up on the ground surface.

Figure 2:
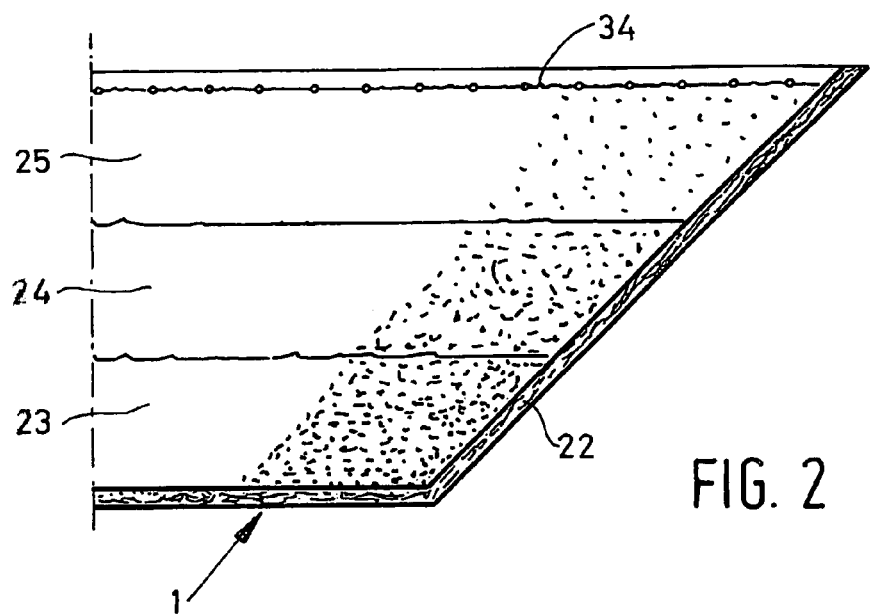
FIG. 2 schematically shows part of the basin used in the plant that is shown in FIG. 1, in which three layers, each having a different salt content, are present in the basin.

The basin will preferably have a depth of at least 3 m, and the rising walls of the basin will preferably slope at an angle of 45°. As is schematically shown in FIG. 2, the bottom and the side walls of the basin may be covered with a layer of sand 22 having a thickness of 10 cm, if the nature of the ground renders this necessary.

Subsequently, the bottom and the sloping walls of the basin 1 will be covered with a foil, preferably a black foil, with the foil covering the bottom and the side walls as a whole, in such a manner that water cannot permeate therethrough.

Then the basin is filled with salt water, in such a manner that a lower layer of water 23 having a height of 1 m and a salt content of 24%, a middle layer of water 24 having a height of 1 m and a salt content of 15% and an upper layer of water 25 having a height of 1 m and a salt content of 0-4% will be formed.

Figure 3:
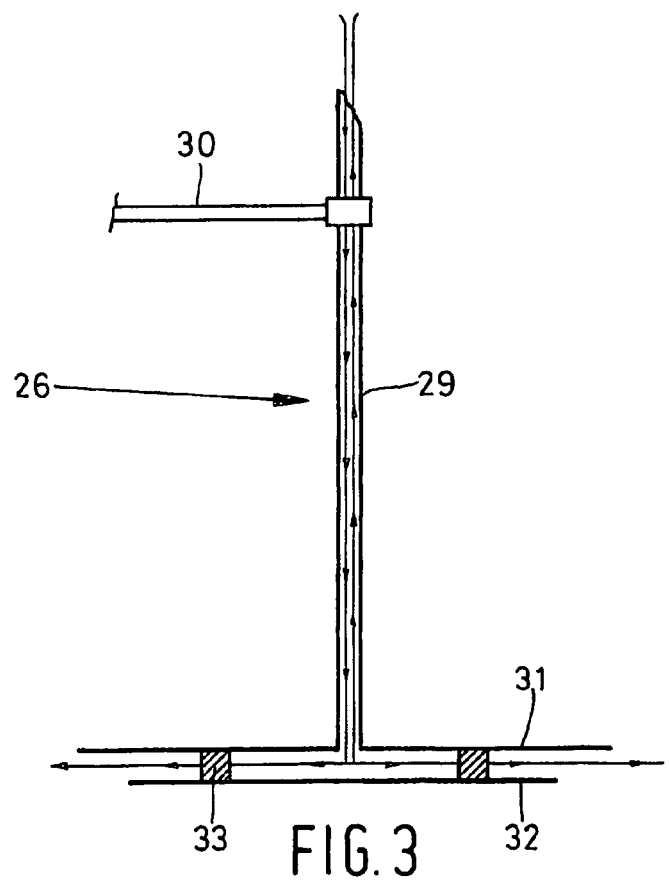
FIG. 3 schematically shows a device for supplying salt-containing water to the basin.

The forming of the layers of water, each having a different salt content, can be carried out in an efficient manner by using the device 26 that is schematically shown in FIG. 3; two such devices are connected to the free end of a catwalk 27 extending over part of the basin from one side thereof, which catwalk is preferably provided with guardrails 28.

The device 26 comprises a vertical tube 29, which is vertically movable in a support 30 that is fixed to the catwalk 27. Two horizontal, circular plates 31 and 32 extending parallel to each other are attached to the bottom end of the tube, which plates are interconnected and kept spaced apart by means of spacers 33 disposed between the plates. The upper disk 31 may have a diameter of, for example, 100 cm, and the lower disk 32 may have a slightly smaller diameter of, for example, 80 cm, while the spacers preferably keep the plates 3 cm apart.

The plates 31 and 32 can be positioned at any desired level inside the basin 1 by moving the tube 29 in the support 30.

When the plant is to be put into operation, the basin 1 will first be filled with seawater or the like to a height of 1.80 m.

Then the devices 26 are arranged in such a manner that the plates 31 and 32 will be positioned closely above the heat exchanger 5 that is present in the basin. Following that, water having a high salt content will be supplied to the upper end of the pipe of 29 of each device 26, which water will evenly flow in horizontal direction between the plates 31 and 32 from the pipe 29 and into the basin, as is indicated by the arrows in FIG. 3, without producing any undesirable swirls in the water that is already present in the basin. In this way the layer 23 having a high salt content can be built up in the basin to a height of 1 m, with the water level rising from an original level of 1.80 m to a level of 2.80 m. Then the two devices 26 are moved upwards to a position in which the plates 31,32 are spaced from the bottom of the basin 1 by a distance of about 1.80 m. In this position water having a suitable salt concentration is supplied to the basin again for forming the second layer 24 having a salt content of 15%, with the water level in the basin eventually rising to a level of 3 m.

In practice it has become apparent that very stable interfaces are formed between the various layers due to the specific weight values of the respective layers 23-25, which layers each have their own specific salt content, which interfaces will automatically restore even when disturbed by external influences.

When a basin thus filled is exposed to radiation from the sun, the solar heat will cause the temperature in the lower layer, which has a high salt content, to increase and, which temperature is then maintained there. In practice it has become apparent that the temperature in the lower layer 23 may rise by +1° per day, and that in time a temperature of about 80° C. can be achieved in said lower layer. In the case of a basin having a base of 40×50 m, for example, a hot brine layer 23 having a salt content of +24% covering an area of +2000 m$^2$ will be obtained.

The intermediate layer 24 functions as an insulating layer, with the solar heat being absorbed and transmitted downwards via the upper layer 25.

After the lower layer 23 has thus been heated to the desired temperature, the pump 7 can be activated for pumping water from the pit 4 through the heat exchanger to the evaporator. The heat exchanger will withdraw heat from the layer 23, so that the water being discharged from the heat exchanger will have a temperature approximately equal to the temperature of the water in the layer 23. If desired, said temperature may be further increased in the flow heater 10. The water thus being supplied to the evaporator 9 will evaporate to a large extent, and subsequently the vapor will be supplied to the condenser. Residual water, which will have a comparatively high salt content, can be drained off via the pipe 17, as described above.

The water vapor being supplied to the condenser 12 will evaporate in the condenser and the desalinated water thus formed can be drained from the condenser 12 by means of the pump 15 as described above.

The water present in the pit 4 is already preheated by the residual heat from the condensed water, so that the temperature of the water being supplied to the heat exchanger 5 may be higher already than that of the seawater being supplied to the pit.

The desalinated water supplied to the basin 21 may be subjected to further treatments before being used, if desired.

The operation of the plant requires only little energy, which energy is needed for driving the pumps 7 and 15 and the flow heater 10. This energy may be generated by a windmill, for example, but it is also conceivable to use solar collectors or the like for this purpose.

The energy that is generated may be stored in batteries for use during periods when there is no wind to drive the windmill and/or that the solar collectors do not generate enough energy.

As is furthermore schematically shown in FIG. 2, a so-called wave breaker 34 (only schematically shown) may be provided near the upper side of the basin 1 for the purpose of preventing undesirable waves being formed at the surface of the basin.

Figure 4:
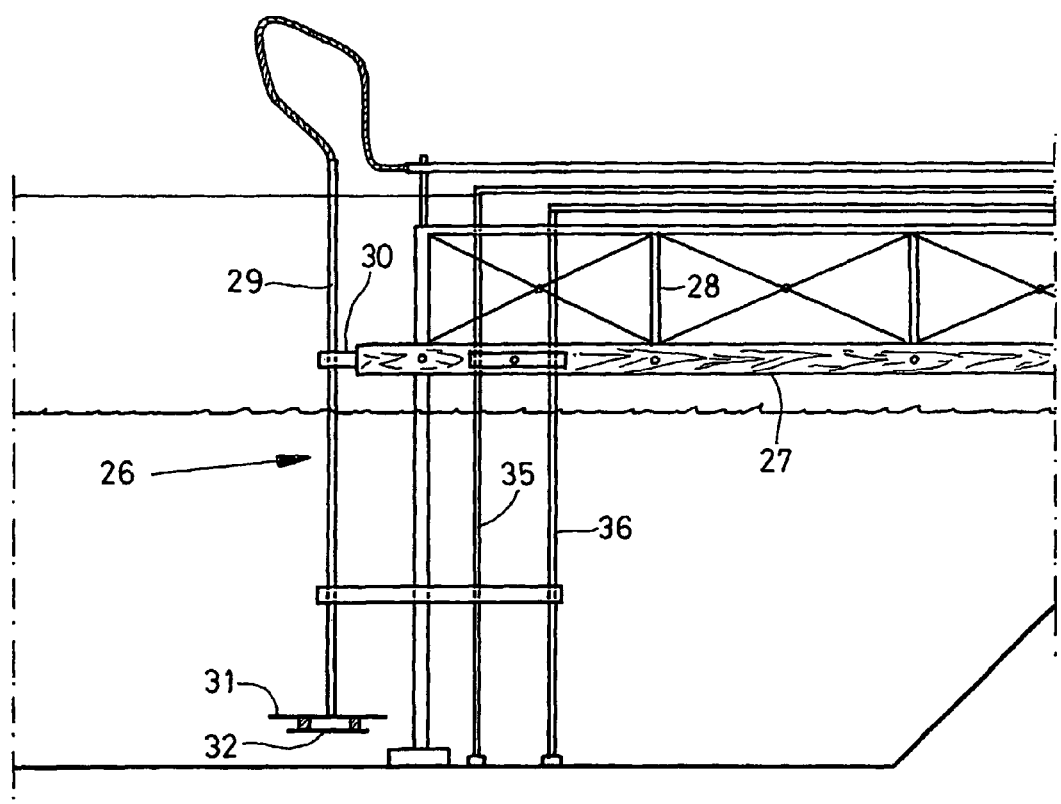
FIG. 4 schematically shows part of the basin used in the plant that is shown in FIG. 1, with a catwalk extending over part of the basin.
Figure 5:
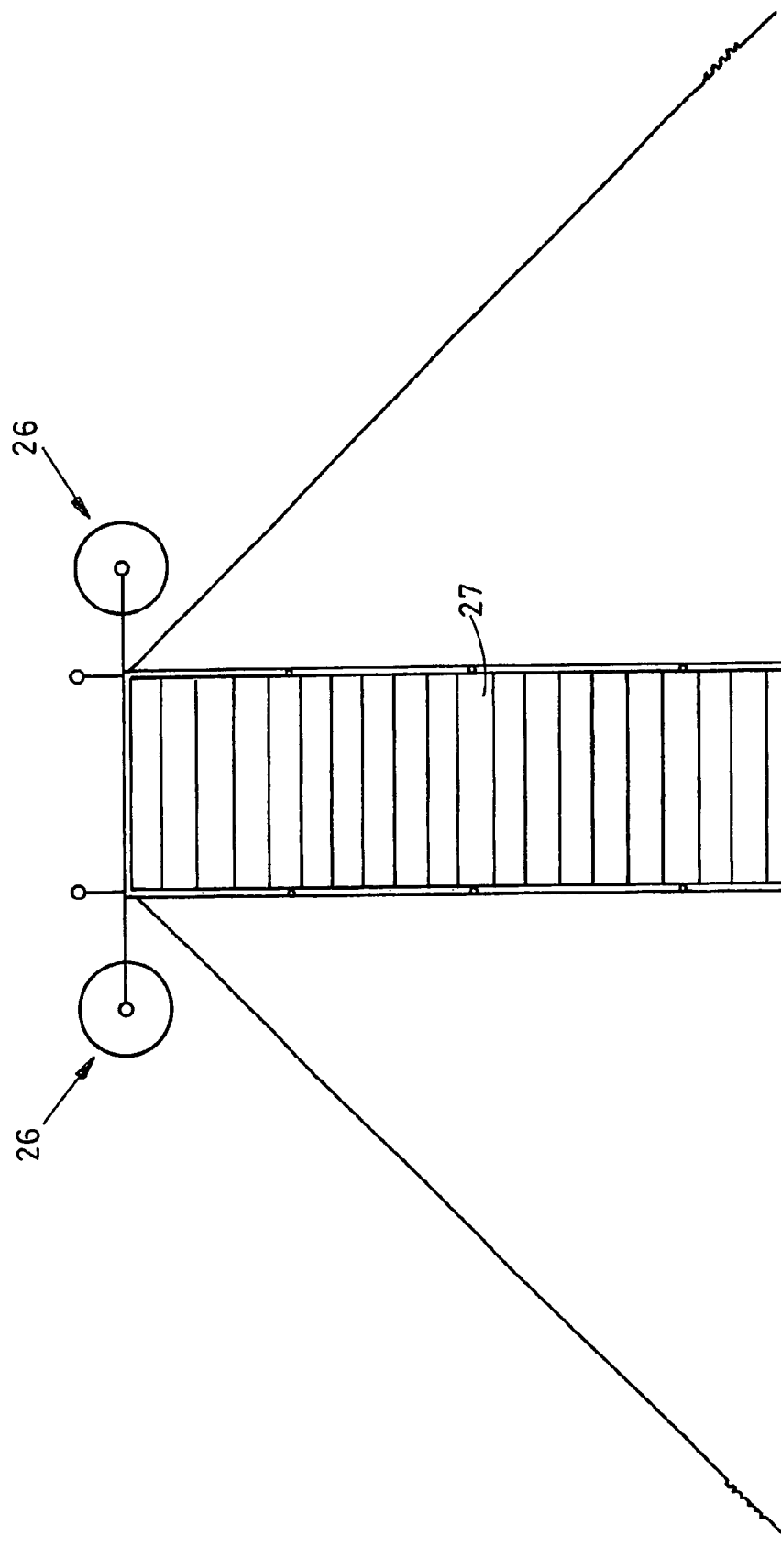
FIG. 5 is a schematic top plan view of FIG. 4.

Furthermore, sensors 35 and 36 may be provided, for example on the catwalk 27, as schematically shown in FIG. 4, for measuring the temperature in the various layers in the basin and for measuring the salt content of the various layers.

Furthermore, gauges for measuring the air temperature and, if a windmill is used, for measuring the wind velocity may be provided.

The various sensors and gauges may be connected to a central control unit for controlling the operation of the plant, such as activating the pumps 7 and 15 and controlling the windmill, for example adjusting the blades of the windmill and activating and/or deactivating the windmill.

From the above it will be apparent that a plant that will require little maintenance and that will consume little energy has been obtained, which energy can moreover be generated by a windmill or by solar collectors or the like.

The invention claimed is:

1. A method for desalinating salt-containing water, which comprises the steps of:
   (a) passing salt-containing water through a heat exchanger disposed in a basin containing solar-heated brine formed by several layers of water lying one above the other in the basin, each of said layers of water forming the brine having a higher salt content than the layer present there above, wherein the heat exchanger is disposed in the lowermost layer of water having a higher temperature than the temperature of the layers of water lying above the lowermost layer of water;
(b) heating the salt-containing water in the basin using indirect heat exchange with the solar-heated brine to obtain heated salt-containing water;
(c) evaporating at least part of the heated salt-containing water to obtain water vapor;
(d) condensing the water vapor to obtain desalinated water; and
(e) passing the desalinated water through a second heat exchanger disposed in a pit holding the salt-containing water to be desalinated, to pre-heat the salt-containing water in the pit by indirect heat exchange with the desalinated water, and supplying the pre-heated salt-containing water to the heat exchanger disposed in the basin according to step (a).

2. The method for desalinating salt-containing water defined in claim 1 wherein according to step (d) the water vapor is condensed in a condenser, in which a cooler for supplying cool air is connected to the condenser.

3. A method for desalinating salt-containing water, which comprises the steps of:
(a) passing salt-containing water through a heat exchanger disposed in a basin containing solar-heated brine formed by several layers of water lying one above the other in the basin, each of said layers of water forming the brine having a higher salt content than the layer present there above, wherein the heat exchanger is disposed in the lowermost layer of water forming the brine having a higher temperature than the temperature of the layers of water forming the brine lying above the lowermost layer of water and wherein the brine in the basin contains a lower level of water having a salt content of $\pm 24\%$, a middle layer of water having a salt content of $\pm 15\%$ and an upper layer of water having a salt content of $\pm 0\text{-}4\%$;
(b) heating the salt-containing water in the basin using indirect heat exchange with the solar-heated brine to obtain heated salt-containing water;
(c) evaporating at least part of the heated salt-containing water to obtain water vapor; and
(d) condensing the water vapor to obtain desalinated water.

4. The method for desalinating salt-containing water defined in claim 3 wherein each of the layers of water is formed to a height of $\pm 1$ m.

* * * * *